United States Patent [19]
Sakai

[11] Patent Number: 6,131,143
[45] Date of Patent: Oct. 10, 2000

[54] MULTI-WAY ASSOCIATIVE STORAGE TYPE CACHE MEMORY

[75] Inventor: Toshichika Sakai, Tokyo, Japan

[73] Assignee: NEC Corporation, Tokyo, Japan

[21] Appl. No.: 09/089,091

[22] Filed: Jun. 2, 1998

[30] Foreign Application Priority Data

Jun. 9, 1997 [JP] Japan ................................ 9-150796

[51] Int. Cl.[7] .................................................. G06F 12/08
[52] U.S. Cl. ........................ 711/128; 711/129; 711/173; 365/49
[58] Field of Search ................................... 711/118, 128, 711/154, 156, 129, 173; 365/49

[56] References Cited

U.S. PATENT DOCUMENTS

| | | |
|---|---|---|
| 5,206,941 | 4/1993 | Eikill et al. . |
| 5,325,504 | 6/1994 | Tipley et al. ............................ 711/128 |
| 5,684,976 | 11/1997 | Soheili-Arasi et al. ................ 711/128 |

FOREIGN PATENT DOCUMENTS

| | | |
|---|---|---|
| 1-173144 | 7/1989 | Japan . |
| 2-161546 | 6/1991 | Japan . |
| 4-328656 | 11/1992 | Japan . |
| 8-235052 | 9/1996 | Japan . |

OTHER PUBLICATIONS

Japanese Office Action, dated Jun. 22, 1999, with English Language Translation of Japanese Examiner's comments.

*Primary Examiner*—Hiep T. Nguyen
*Attorney, Agent, or Firm*—McGuire Woods, LLP

[57] ABSTRACT

An associative storage type cache memory is disclosed, which comprises a decoder for decoding an entry address designated by a data processing unit, a first tag memory for storing higher-order bits of an address tag, the first tag memory being common to multiple ways, second tag memories for storing lower-order bits of the address tag, the second tag memories corresponding to the individual ways, data memories for storing data designated by an address consisting of the contents of the first and second tag memories, a first comparator for comparing higher-order bits of a tag address with the contents of the first tag memory, second comparators for comparing lower-order bits of the tag address with the contents of the second tag memories, respectively, and a way selector for selecting data from the data memories corresponding to hit signals received from the first and second comparators and outputting the selected data.

4 Claims, 4 Drawing Sheets

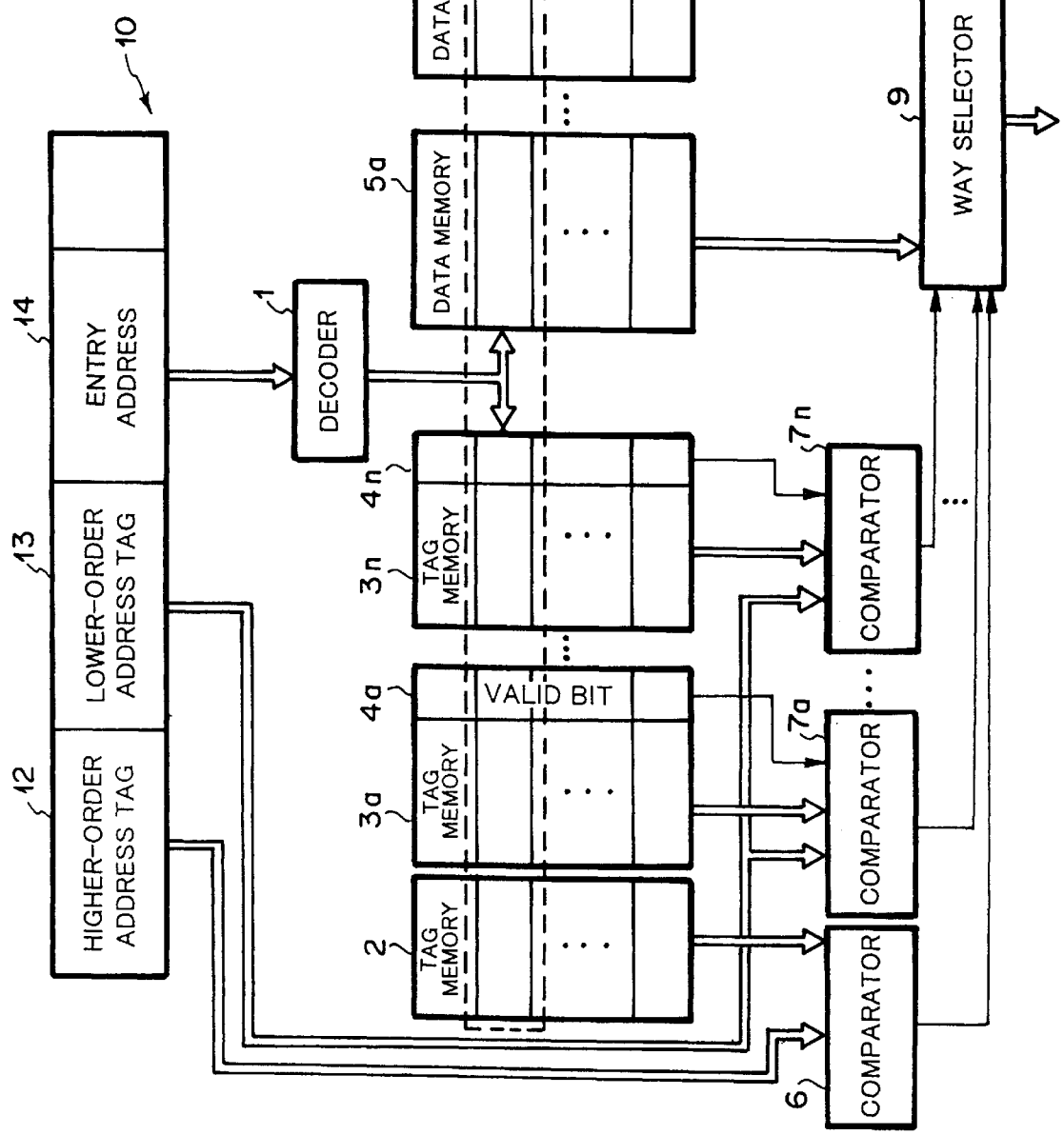
F I G. 1

MULTI-WAY ASSOCIATIVE STORAGE TYPE CACHE MEMORY

BACKGROUND OF THE INVENTION

1. Field of the Invention:

The present invention relates to an associative storage type cache memory and in particular, to a multi-way associative storage type cache memory having a data memory and a tag memory, wherein the data memory stores a part of data in a main memory accessed by a data processing unit, the tag memory stores address tags corresponding to addresses in the main memory of the data stored in the data memory. When the address designated by the data processing unit is identical with the content stored in the tag memory, the associative storage type cache memory outputs data stored in the data memory corresponding to the address tag to the data processing unit.

2. Description of the Prior Art:

In recent years, as the functions of microprocessors have improved, there has been a marked tendency that high speed associative memories such as cache memories are embedded in microprocessor chips so as to accelerate the memory access speed that critically influences the performance of the microprocessors. Thus, the storage capacitance of the associative memory increases, wherby the associative memory occupies most of the areas of the microprocessor chip. Consequently, the performance, area, and power consumption of the associative memories largely affect those of the microprocessor.

The bit width of tag memory of the cache memories used in recent microprocessors has become relatively wide as compared with the bit width of addresses of data memory. For example, there is known a cache memory having a tag memory of 20-bit width used with data memory having 32-bit address width. Thus, the ratio of tag memory cells to all memory cells of an associative memory becomes large. In addition to reading/writing data at high speed, a cache memory has to quickly determine whether or not data has been stored therein. Thus, the cache memory has to read, write, and compare all of the bits of a tag memory having a large bit width at a time. Consequently, the power consumption of the tag memory becomes large. Thus, the power consumption of the associative memory and accordingly of the microprocessor increases.

Particularly, when the associative type cache memory has n tag memories per entry and the bit width of an address tag is W bits, data consisting of (W×n) bits in memory cells of the tag memories are read out and the data are subjected to comparison in n pieces of comparator having W-bit width for one data access. Thus, the power for (W×n) bits is consumed for one data access.

FIG. 3 is a block diagram showing an example of a conventional cache memory as a first prior art. The cache memory shown in FIG. 3 is a seven-bit-address, four-entry, two-way associative type cache memory.

In FIG. 3, address 10 supplied from a data processing unit to an address bus is composed of four-bit address tag 11, two-bit entry address 14, and one-bit byte address 15.

The cache memory comprises decoder 1, tag memories 3'a and 3'b, data memories 5a and 5b, valid bits 4a and 4b, comparators 7'a and 7'b, byte selectors 8a and 8b, and way selector 9. Decoder 1 decodes entry address 14 of address 10. Data memories 5a and 5b store data of two bytes per entry address. Valid bits 4a and 4b represent whether or not the contents stored in data memories 5a and 5b are valid, respectively. Comparators 7'a and 7'b determine whether or not data stored in data memories 5a and 5b are valid based on the result of comparison between the contents of address tag 11 and the contents of tag memories 3'a and 3'b and on valid bits 4a and 4b, respectively. Byte selectors 8a and 8b select one of byte data in memories 5a and 5b corresponding to byte address 15, respectively. Way selector 9 selects one of or none of output data of byte selectors 8a and 8b corresponding to bit signals 16a and 16b that represent determined results of comparators 7'a and 7'b, respectively.

In FIG. 3, suffixes a and b of references such as 3'a and 3'b representing tag memories and 5a and 5b representing data memories represent ways a and b, respectively. The valid bits 4a and 4b represent whether or not the contents of data memories 5a and 5b are consistent with the contents of the main memory, respectively.

Next, the operation of the cache memory will be explained.

when address 10 is supplied from the data processing unit, entry address 14 is decoded by decoder 1. The contents at the selected entry address of tag memories 3'a and 3'b are supplied to comparators 7'a and 7'b, respectively. In addition, the contents at the selected entry address of data memories 5a and 5b are supplied to byte selectors 8a and 8b, respectively. The byte data selected by byte selectors 8a and 8b are supplied to way selector 9.

When comparators 7'a or 7'b determine that the contents at the selected entry address of tag memories 3'a or 3'b are identical with address tag 11 and also valid bits 4a or 4b are active, bit signal 16a or 16b becomes active.

When there is present a way in which the contents at the selected entry address of tag memory 3'a or 3'b are identical with address tag 11, data of the way are output from way selector 9. When there is present no way in which the contents at the selected entry address of the tag memory 3'a or 3'b are identical with address tag 11, relevant data in a main memory (not shown) rather than the cache memory are accessed by data processing unit. In addition, the data are stored in data memories 5a and 5b of the cache memory.

In the cache memory explained above, the number of memory cells of tag memories increases in proportion to the number of data elements stored in the data memories. As a second prior art, there is a cache memory with a reduced number of memory cells of tag memories disclosed in JPA-2-161546 in which hardware efficiency is improved.

In the cache memory of the second prior art, in order to accomplish the aforementioned object, tag memories are divided into a plurality of bit groups according to bit order. Bit group in higher bit order is unified into one common memory which corresponds to one entry. FIG. 4 shows an example of a two-way associative type, seven-bit address, four-entry cache memory according to the second prior art.

In FIG. 4, the tag memory is divided into first tag memories 33a and 33b and second tag memories 36a and 36b of which each has two-bit width. First tag memories 33a and 33b store two high-order bits out of four bits of address tag 11. Second tag memories 36a and 36b store two lower-order bits out of four bits of address tag 11 per entry. Data memories 5a and 5b store two-byte data corresponding to a four-bit address whose higher-order bits are the two bits in first tag memories 33a and 33b and whose lower-order bits are the two bits in second tag memories 36a and 36b, respectively. In other words, data memories 5a and 5b store only data at the address whose two higher-order bits are the two bits stored in first tag memories 33a and 33b, respectively.

Thus, when the data which is read from the main memory will be stored in data memory 5a or 5b in case that both of the pair of tag memories 33a and tag memories 36a and the pair of tag memory 33b and tag memory 36b are not identical with the address tag 11, the two higher-order bits of address tag 11 must be identical with the contents of first tag memory 33a or 33b.

As explained above, in the multi-way associative type cache memory of the first prior art, whenever data access operation is performed, data of all the memory cells in tag memories having W×n bit size are read simultaneously and subjected to comparison in n pieces of W-bit width comparator. Thus, the power for W×n bits is consumed.

On the other hand, in a direct map type cache memory equivalent to a one-way associative type cache memory, whenever data access operation is performed, data is read from a W-bit width tag memory and then the contents of the tag memory and the address tag are compared over W bits. Thus, the multi-way associative type cache memory consumes the power n times as large as the direct map type cache memory. However, since the direct map type cache memory has a lower hit rate than the multi-way associative type cache memory, the performance of the microprocessor of the former type becomes poor.

In the cache memory of the second prior art having the decreased number of tag memory cells, although the power required for reading data from the tag memory cells is decreased by the amount corresponding to the decreased number of tag memory cells and the decreased load capacitance of word lines of the tag memories, whenever data access operation is performed, data must be read from (W×n) tag memory cells and then the address tag and the contents of the tag memories must be compared over W×n bits. Thus, the cache memory of the second prior art requires larger power consumption than the direct map type cache memory.

SUMMARY OF THE INVENTION

An object of the present invention is to provide an associative storage type cache memory in which the power consumption is decreased and hit rate is maintained.

According to the present invention, there is provided a multi-way associative storage type cache memory, which comprises: a data memory for storing a part of data in a main memory accessed from a data processing unit; a tag memory for storing an address tag corresponding to an address of the main memory with respect to the data stored in the data memory; and means for comparing an address designated by the data processing unit with the contents stored in the tag memory and outputting the data stored in the data memory corresponding to the address tag to the data processing unit when the designated address and the contents are identical, wherein the tag memory is divided into a first tag memory and a second tag memory, the first tag memory having a bit group common to all of the ways, the second memory tag having bit groups corresponding to the individual ways, and wherein the address designated by the data processing unit is divided into two portions and each portions are compared with the contents of the first tag memory and the contents of the second tag memory, respectively.

A virtual address may be stored in the tag memory. The virtual address is divided into a higher-order bit group and a lower-order bit group. The higher-order bit group is stored in the first tag memory, and the lower-order bit group is stored in the second tag memory.

The bit width of the first tag memory is preferably determined according to the hit rate of data accessed successively by the data processing unit.

These and other objects, features and advantages of the present invention will become more apparent in light of the following detailed description of the preferred embodiment thereof, as illustrated in the accompanying drawings.

BRIEF DESCRIPTION OF DRAWINGS

FIG. 1 is a block diagram showing an associative storage type cache memory according to an embodiment of the present invention;

DESCRIPTION OF PREFERRED EMBODIMENT

[embodiment]

Figure 2:
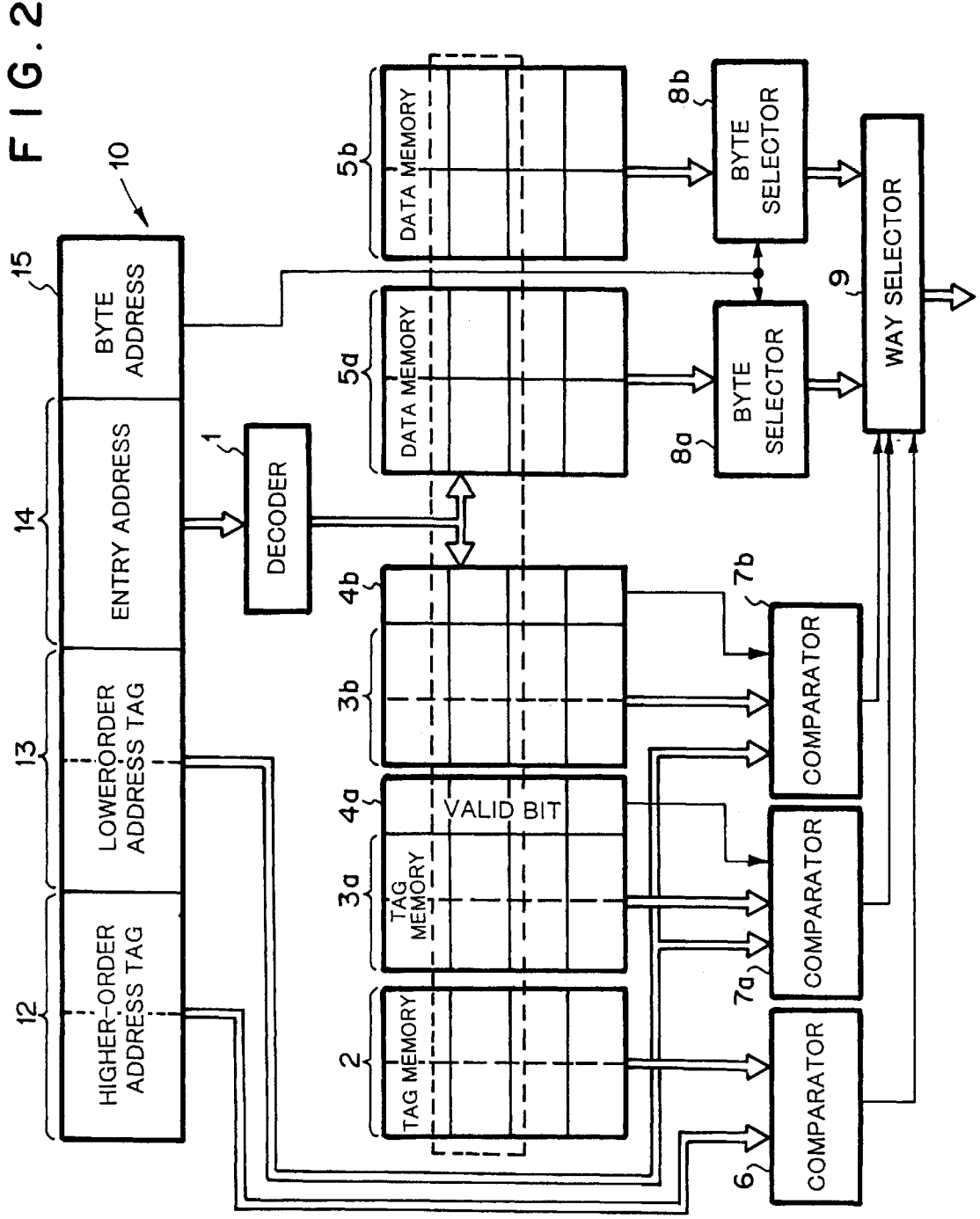
FIG. 2 is a block diagram showing an associative storage type cache memory according to an example of the present invention.

Next, with reference to the accompanying drawings, an embodiment of the present invention will be explained.

FIG. 1 is a block diagram showing a cache memory according to the embodiment of the present invention.

Referring to FIG. 1, the cache memory comprises decoder 1, first tag memory 2, second tag memories 3a, . . . , and 3n, multi-way data memories 5a, . . . , and 5n, comparators 6, 7a, . . . , and 7n, and way selector 9. Decoder 1 decodes an entry address. First tag memory 2 is common to n ways. First tag memory 2 stores higher-order bits of an address tag. Second tag memories 3a, . . . , and 3n store lower-order bits of the address tag corresponding to the individual n ways. Multi-way data memories 5a, . . . , and 5n store data corresponding to addresses composed of the bits in first tag memory 2 and bits in second tag memories 3a, . . . , and 3n, respectively. Comparator 6 compares higher-order address tag 12 with the contents of first tag memory 2. Comparators 7a, . . . , and 7n compare low order address tag 13 with the contents of second tag memories 3a, . . . , and 3n, respectively. Way selector 9 selects one of data stored in data memories 5a, . . . , and 5n corresponding to hit signals received from comparators 6, 7a, . . . , and 7n.

Address 10 that is supplied from a data processing unit to an address bus is composed of higher-order bit address tag 12, lower-order bit address tag 13, and entry address 14.

Next, the operation of the cache memory according to the embodiment will be explained.

Now, it is assumed that entry i is selected corresponding to entry address 14 in address 10 supplied from the data processing unit.

In FIG. 1, the contents of first tag memory 2 at entry address i is supplied to the comparator 6. The contents of second tag memories 3a, . . . , and 3n at entry address i and the contents of the valid bits 4a, . . . , and 4n are supplied to the comparators 7a, . . . , and 7n, respectively. In addition, the contents of data memories 5a, . . . , and 5n at entry address i are supplied to way selector 9.

Comparator 6 determines whether or not the contents of first tag memory 2 at entry address i is identical with higher-order address tag 12 in the address 10 supplied from the data processing unit and supplies the determined result as a first hit signal to way selector 9. When the contents of first tag memory 2 is identical with address tag 12, the first hit signal becomes active.

Comparators 7a, . . . , and 7n determine whether or not the data in data memories 5a, . . . , and 5n at entry address i are valid corresponding to the contents of valid bits 4a, ..., and 4n, respectively. In addition, comparators 7a, ..., and 7n determine whether or not the contents of second tag memories 3a, ..., and 3n are identical with lower-order address tag 13, respectively. The comparators 7a, ..., and 7n supply the respective determined results as second hit signals to way selector 9. When data in data memories 5j (j=a, ..., n) at entry address i are valid and the contents of second tag memories 3j (j=a, ..., n) at entry address i are identical with lower-order address tag 13, the second bit signals becomes active.

When there is a way j of which the first hit signal and the relevant second hit signal are active, way selector 9 outputs data of way j to the data processing unit as a cache hit operation.

In other cases, that is, in case that one of or both of the first hit signal and the second hit signals is/are not active, as a cache miss operation, data access operation is performed to a main memory rather than the cache memory. In this case, data read from the main memory are stored in data memory 5 of the cache memory.

EXAMPLE 1

Next, with reference to FIG. 2, a two-way associative type cache memory according to Example 1 of the present invention will be explained.

FIG. 2 is a block diagram showing the cache memory according to Example 1 of the present invention.

The cache memory according to Example 1 is a seven-bit address, four-entry, two-way associative type cache memory. Referring to FIG. 2, the cache memory comprises decoder 1, first tag memory 2, second tag memories 3a and 3b, data memories 5a and 5b, first comparator 6, second comparators 7a and 7b, byte selectors 8a and 8b, and way selector 9.

In common with the second prior art, address 10 is composed of two-bit higher-order address tag 12, two-bit lower-order address tag 13, two-bit entry address 14, and one-bit byte address 15.

Figure 3:
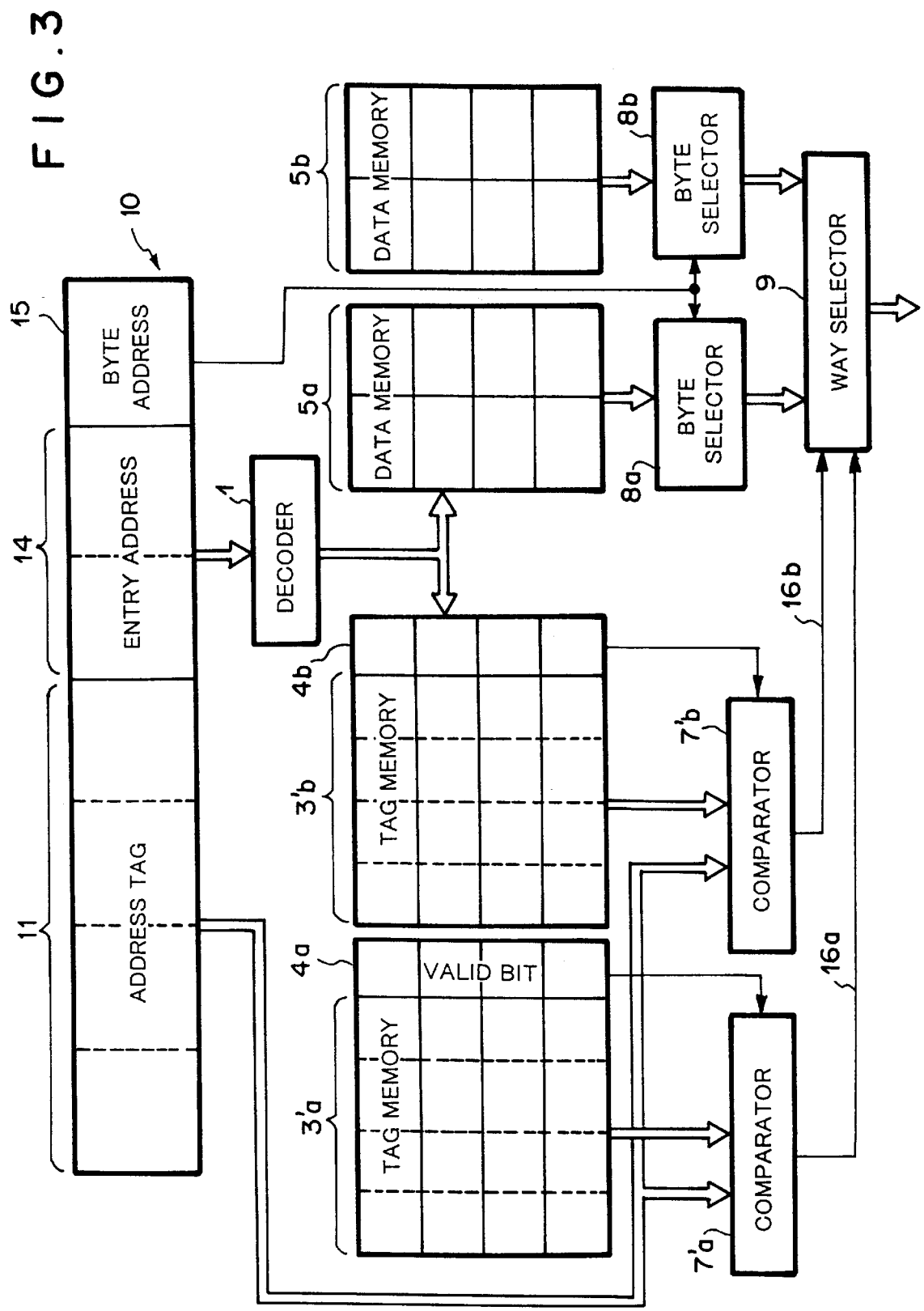
FIG. 3 is a block diagram showing a cache memory according to a first prior art.
Figure 4:
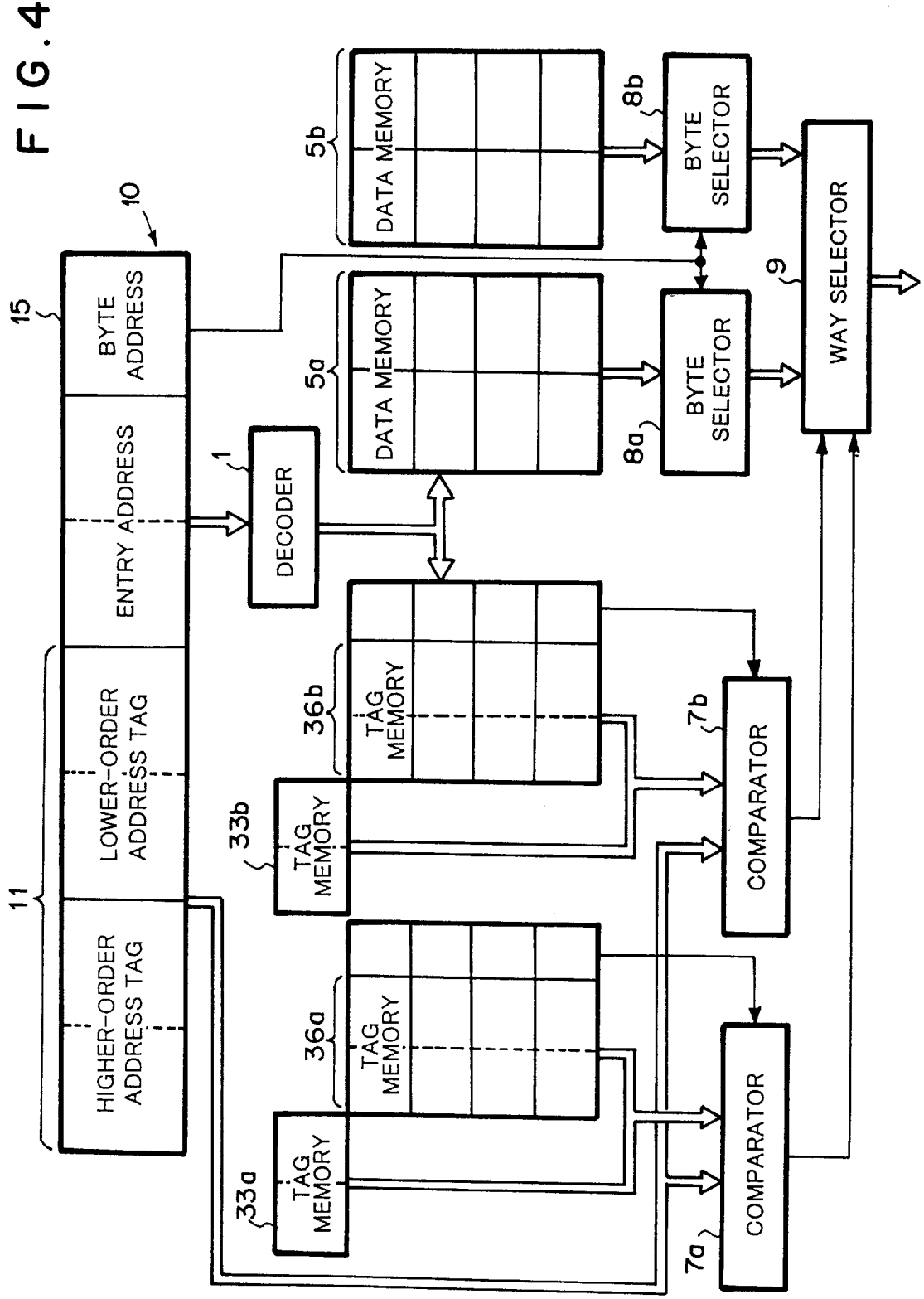
FIG. 4 is a block diagram showing a cache memory according to a second prior art.

First tag memory 2 stores two higher-order bits corresponding to higher-order address tag 12. Second tag memories 3a and 3b store two lower-order bits corresponding to low address tag 13. First tag memory 2 is common to two ways per entry. In other words, two higher-order bits of tag memories 3'a and 3'b shown in FIG. 3 or tag memories 33a and 33b shown in FIG. 4 are modified to construct two-bit tag memory 2 common to all ways per entry.

First comparator 6 compares the contents of higher-order address tag 12 with the two bits of first tag memory 2 and determines whether or not they are identical. The first comparator 6 supplies the determined result as a first hit signal to way selector 9.

Second comparators 7a and 7b determine whether or not data at the entry determined by entry address 14 are valid for each of ways a and b by referring to the contents of valid bits 4a and 4b, respectively. In addition, second comparators 7a and 7b compares the contents of lower-order address 13 with the two bits in second tag memories 3a and 3b and determine whether or not they are identical, respectively. Second comparators 7a and 7b supply the determined results as second hit signals to way selector 9.

Way selector 9 selects the data of the way for which cache hit takes place based on the first and second hit signals and supplies the selected data to the data processing unit. When cache miss takes place, relevant data in a main memory (not shown) rather than the cache memory are accessed by data processing unit. In addition, the data are stored in data memories 5 of the cache memory.

EXAMPLE 2

In case that the cache memory is applied to a TLB (Translation Look-aside Buffer) system in which address conversion is executed by an associative memory operation, tag memories 2, 3a, and 3b store virtual addresses and data memories 5 store a protection field, usage bits, and dirty bits as well as physical page frame numbers. However, in common with Example 1, the virtual addresses are divided into upper-bit group which is stored in first tag memory 2 and lower-bit group which is separately stored in second tag memories 3a and 3b.

Next, explanation is made on set associative type cache memory which has tag memory of W-bit width and of which association degree is n.

According to the present invention, the width of the tag memory is divided into width W1 and width W2. Width W1 represents the width of a bit group common to all ways and width W2 represents the width of a bit group of which members are unique for respective ways. To determine whether or not data requested by a data processing unit has been stored in the cache memory, that is, a cache hit has taken place in the cache memory, (W1+W2×n) bits in the tag memory at the entry corresponding to the entry address indicated by the processing unit are read from the tag memory simultaneously and the comparison between address tag and tag memory is executed over (W1+W2×n) bits.

On the other hand, in the first prior art, W×n (=(W1+W2)×n) bits in the tag memory at the entry corresponding to the entry address indicated by the processing unit are read from the tag memory simultaneously and comparison between address tag and tag memory is executed over (W×n) bits.

Thus, comparing the total power consumption of a tag memory and a set of comparators per one access by a data processing unit between the present invention and the first prior art, the power consumption of the present invention is decreased by the amount proportional to {(W1+W2)×n}−{W1+W2×n}=(n−1)×W1 bits in comparison with the first prior art.

In the second prior art, the tag memory is divided into the first tag memory and the second tag memory and the first memory is unified to form a single memory common to all entries for each ways. The power consumption required to read the tag memory is proportional to the number of entries because parasitic capacitance of the word line consumes the power and the length of the word line is proportional to the number of entries. Therefore, the power consumption required to read the tag memory of the second prior art compared with the first prior art is decreased by the amount corresponding to the power consumption necessary to drive word lines of bit width of the first tag memory. However, when an address tag is compared with the contents of the tag memories in each way, data of (W1+W2) bits are compared at a time. Thus, in the second prior art, the power for comparators corresponding to (W1+W2)×n bits is consumed. Consequently, in comparison with the second related art reference, according to the present invention, the power consumption for comparators corresponding to (n−1)×W1 bits is decreased.

In general, because a program processed in a data processing unit has locality, if the cache memory of the present invention is used as an instruction cache memory, the probability that higher-order bits of address tags for successive access are the same is high. Thus, the active state of the first hit signal usually continues. Therefore, even if the number of bits of the tag memories is decreased by increasing the width of the first tag memory in order to decrease the power consumption, cache hit rate is not lowered.

As described above, according to the present invention, tag memories are divided into a first tag memory and a second tag memory, wherein the first tag memory has a bit group common to all ways and the second tag memory has bit groups corresponding to the individual ways. An address designated by a data processing unit is divided and compared corresponding to the first and second tag memories. Thus, the power consumption necessary for comparing the address tag with the contents of the address memories is decreased. Consequently, the power consumption of the microprocessor can be decreased without lowering the hit rate.

Although the present invention has been shown and described with respect to the preferred mode embodiment thereof, it should be understood by those skilled in the art that the foregoing and various other changes, omissions, and additions in the form and detail thereof may be made therein without departing from the spirit and scope of the present invention.

What is claimed is:

1. A multi-way associative storage type cache memory, which comprises:

a data memory for storing a part of data in a main memory accessed from a data processing unit;

a tag memory for storing an address tag corresponding to an address of the main memory with respect to the data stored in said data memory; and means for comparing an address designated by said data processing unit with the contents stored in said tag memory and outputting the data stored in said data memory corresponding to the address tag to the data processing unit when said designated address and said contents are identical, wherein said tag memory is divided into a first tag memory and a second tag memory, said first tag memory having a bit group common to all of the ways, said second memory tag having bit groups corresponding to the individual ways, and wherein the address designated by said data processing unit is divided into two portions and each portions are compared with the contents of said first tag memory and the contents of said second tag memory, respectively.

2. The multi-way associative storage type cache memory as set forth in claim 1, wherein a virtual address is stored in said tag memory, said virtual address being divided into a higher-order bit group and a lower-order bit group, said higher-order bit group being stored in said first tag memory, said lower-order bit group being stored in said second tag memory.

3. The multi-way associative storage type cache memory as set forth in claim 1, wherein the bit width of said first tag memory corresponds to a width of the bit group which is common to all of the ways.

4. A multi-way associative storage type cache memory, which comprises:

a decoder for decoding an entry address designated by a data processing unit;

a first tag memory for storing higher-order bits of an address tag, said first tag memory being common to multiple ways;

second tag memories for storing lower-order bits of said address tag, said second tag memories corresponding to the individual ways;

data memories for storing data corresponding to the address composed of the contents of said first tag memory and the contents of said second tag memories;

a first comparator for comparing higher-order bits of a tag address designated by said data processing unit with the contents of said first tag memory;

second comparators for comparing lower-order bits of said tag address designated by said data processing unit with the contents of said second tag memories, respectively; and a way selector for selecting data from said data memories corresponding to hit signals received from said first comparator and said second comparators and outputting the selected data.

* * * * *